United States Patent [19]

Otsuki et al.

[11] Patent Number: 4,513,945
[45] Date of Patent: Apr. 30, 1985

[54] ELECTROMAGNETIC REED VALVE

[75] Inventors: Hiromi Otsuki, Anjo; Takashi Kondo, Toyota; Yoshiaki Kondo, Kariya; Haruyuki Obata; Takao Tate, both of Susono; Norikatu Ishikawa, Mishima, all of Japan

[73] Assignees: Nippondenso Co., Ltd., Kariya; Toyota Jidosha Kabushiki Kaisha, Toyota, both of Japan

[21] Appl. No.: 416,693

[22] Filed: Sep. 10, 1982

[30] Foreign Application Priority Data

Sep. 14, 1981 [JP] Japan .............................. 56-136602[U]

[51] Int. Cl.³ ............................................. F16K 31/02
[52] U.S. Cl. .................................... 251/129; 137/863; 137/870
[58] Field of Search ............... 137/863, 870, 871, 878, 137/855, 857; 251/77, 129, DIG. 2

[56] References Cited

U.S. PATENT DOCUMENTS 2,980,139 4/1961 Lynn .................................. 251/77 X
3,768,772 10/1973 Vischulis .............................. 251/129
4,250,924 2/1981 Sakakibara et al. ............ 137/870 X

FOREIGN PATENT DOCUMENTS 52-121820 10/1977 Japan .
865634 4/1961 United Kingdom ................ 137/870

Primary Examiner—A. Michael Chambers
Assistant Examiner—John C. Fox
Attorney, Agent, or Firm—Cushman, Darby & Cushman

[57] ABSTRACT

An electromagnetic reed valve comprises a pressing member which is mounted at a plunger. The pressing member is urged by a spring toward a reed valve body, so that the pressing member urges at least that portion of the reed valve body which confronts the outlet of a valve chamber, when the outlet is closed by the reed valve body.

1 Claim, 4 Drawing Figures

F I G. 1
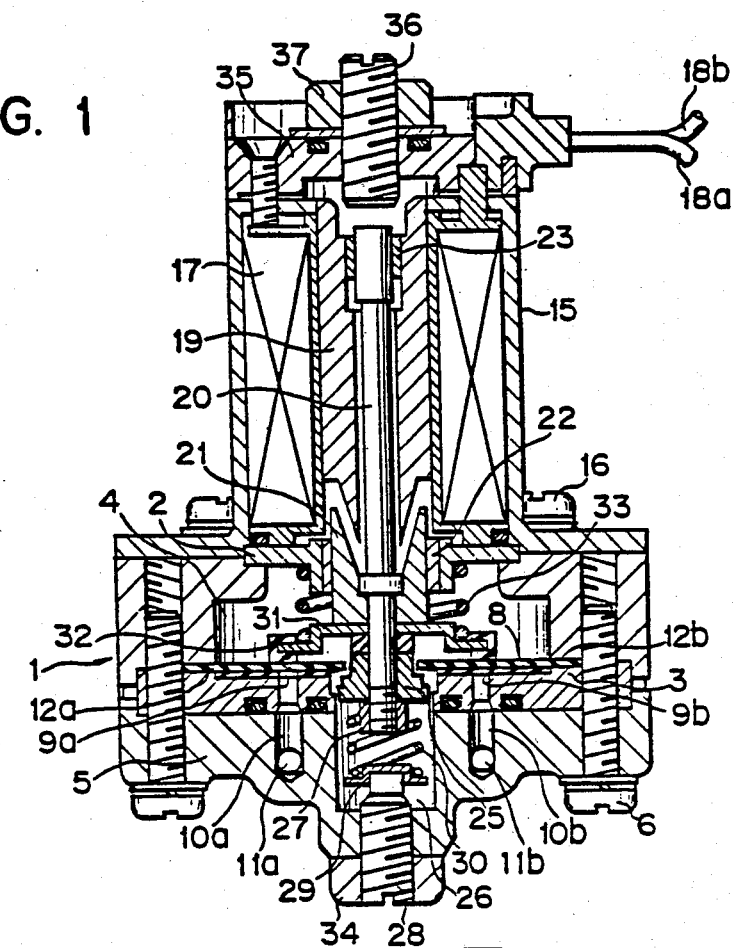
F I G. 2
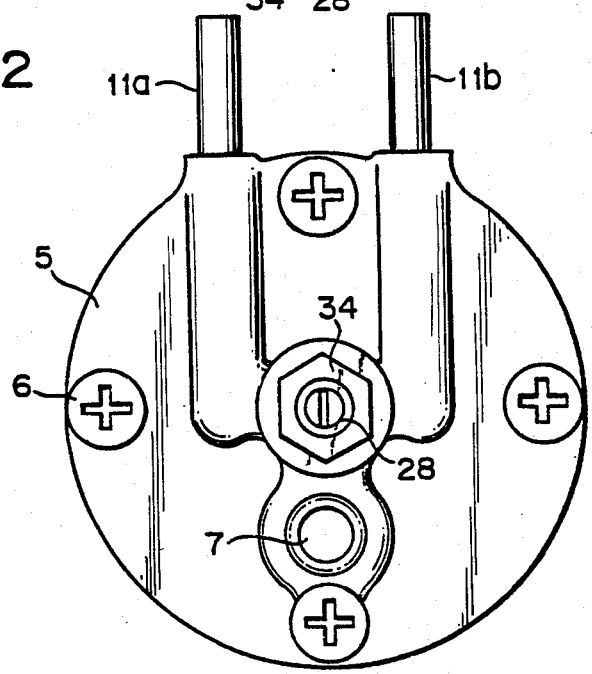

ELECTROMAGNETIC REED VALVE

BACKGROUND OF THE INVENTION

The present invention relates to an electromagnetic reed valve which includes a solenoid and, more particularly, to an electromagnetic reed valve in which the area of the opening of an outlet is varied rectilinearly in response to the amount of current supplied to the solenoid.

In a general electromagnetic reed valve, an outlet is opened in a valve chamber, to which working fluid is introduced. A reed valve body which is formed of an elastic plate is disposed at the valve chamber side in the outlet in a cantilever state where one end of the reed valve body is secured. The outlet of the valve chamber is opened by the reed valve body as required. On the other hand, a plunger which is moved to vary its stroke and hence its lifting amount in response to the amount of current applied to a solenoid is mounted at a lifter. The free end of the reed valve body is engaged by the lifter. In this manner, the outlet of the valve chamber is forcibly opened by deflecting the reed valve body.

In this structure of the electromagnetic reed valve, the area of the opening of the outlet of the valve chamber is proportional to the amount of the lift of the plunger. In the reed valve of this type, when the plunger is not lifted, the free end of the reed valve body is released from the lifter, and the outlet of the valve chamber is closed by means of the elasticity of the reed valve body itself.

However, when the outlet of the valve chamber is closed merely by the recoiling force of the elastic reed valve body as described above, the sealing force of the reed valve body for sealing the outlet of the valve chamber is small because the reed valve body of this type is normally formed of a thin elastic plate, and thus, it is inconvenient. One way to overcome such a difficulty is to impart a small amount of warp to the reed valve body in its counter-warp direction in order to provide an initial elastic force to the valve body, thereby increasing the sealing force of the valve body for the opening of the valve chamber. Since the initial elastic force caused by this warp is limited, however, the reliability of the sealing property of the valve body for the opening of the valve chamber is very low. One disadvantage of the conventional electromagnetic reed valve, then, is that the working fluid may leak from the outlet of the valve chamber. Particularly when dust or the like is interposed in the gap between the reed valve body and the seat surface at the periphery of the opening, the reed valve body will float from the seat surface of the opening, with the result that the leakage of the fluid becomes large and the reed valve accordingly loses its original performance.

SUMMARY OF THE INVENTION

It is an object of the present invention to provide an electromagnetic reed valve which can eliminate the aforementioned disadvantage of the conventional electromagnetic reed valve and which can reliably secure the sealability even if a foreign material is interposed between the reed valve body and the surface of the seat thereof.

In order to achieve the above-mentioned object, there is provided according to the present invention an electromagnetic reed valve comprising a pressing member mounted at a plunger; said pressing member being urged by a spring toward a reed valve body; and said pressing member urging at least that portion of the reed valve body which confronts the outlet of a valve chamber, when the outlet is closed by the reed valve body.

BRIEF DESCRIPTION OF THE DRAWINGS

FIG. 1 is a longitudinal sectional view showing an electromagnetic reed valve according to one preferred embodiment of the present invention;

FIG. 2 is a bottom view of the reed valve shown in FIG. 1;

DETAILED DESCRIPTION OF THE PREFERRED EMBODIMENT

Figure 3:
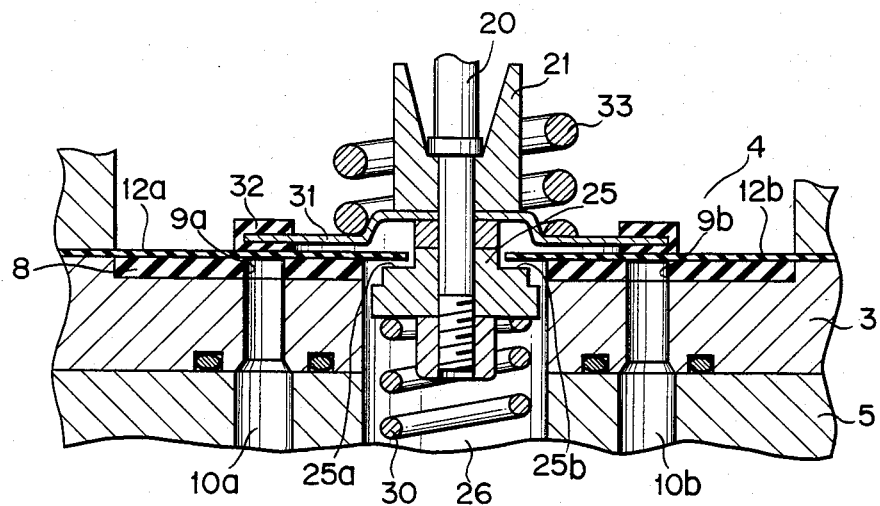
FIG. 3 is a longitudinal enlarged sectional view showing the vicinity of the reed valve provided with a reed valve body in FIG. 1.
Figure 4:
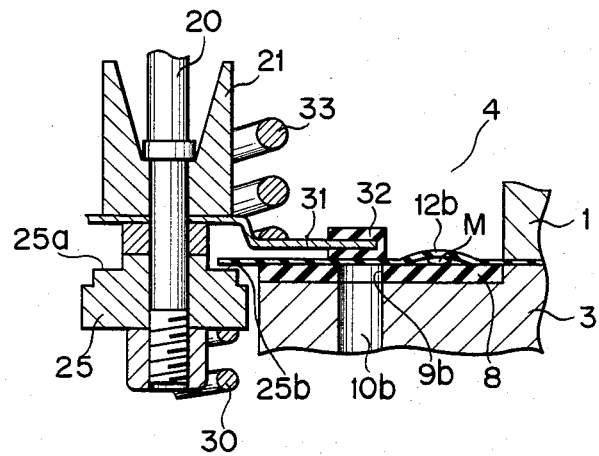
FIG. 4 is a longitudinal sectional view showing the state wherein a foreign material is interposed between the reed valve body and a valve seat.

One preferred embodiment of an electromagnetic reed valve according to the present invention will now be described in detail with reference to the accompanying drawings.

In FIG. 1, reference numeral 1 designates a housing which is open at both ends in a vertical direction. The upper end opening of this housing 1 is closed by a guide plate 2, and the lower end opening of the housing 1 is closed by a base 3. In this manner, a valve chamber 4 is defined in the housing 1. A cover 5 is attached to the lower surface of the base 3. This cover 5 is secured by screws 6 to the housing 1, resulting in that the base 3 is fixed to the housing 1. The valve chamber 4 communicates, as shown in FIG. 2, with an inlet 7 opened at the bottom of the cover 5, and stores fluid which is introduced from the inlet 7 therein.

A valve seat 8 which is made of rubber is lined by means such as baking to the inner surface of the base 3 faced with the valve chamber 4. A pair of outlets 9a and 9b are formed at the valve seat 8. Both the outlets 9a and 9b formed in the base 3 communicate respectively through passages 10a and 10b formed in the cover 5, with exits 11a and 11b attached respectively to the cover 5. A pair of reed valve bodies 12a and 12b are provided in the valve chamber 4. Each reed valve body 12a or 12b is formed of a thin elastic plate. One end of the reed valve body 12a or 12b is clamped between the housing 1 and the base 3, and the other end thereof is disposed as free end, and thus reed valve bodies 12a and 12b are supported in a cantilever state. Each reed valve body 12a or 12b is intimately contacted with the valve seat 8 in a free state such that no external force is applied thereto, resulting in the closure of the outlet 9a or 9b.

A yoke 15 is secured by screws 16 to the upper surface of the housing 1. A solenoid coil 17 are mounted in the yoke 15. Both ends of the solenoid coil 17 is connected to lead wires 18a and 18b, respectively, and a current is introduced to the solenoid coil 17 through the lead wires 18a and 18b. A stator core 19 is mounted in the yoke 15. A shaft 20 is vertically movably passed through the center of the stator core 19. A plunger 21 is provided below the stator core 19. This plunger 21 is fixed to the lower portion of the shaft 20. The plunger 21 is guided so as to slide smoothly with the aid of a bushing 22 provided at the guide plate 2 upon vertical movement of the shaft 20. The upper end of the shaft is guided so as to slide smoothly by means of the other bushing 23 provided at the upper end of the core 19.

A lifter 25 is secured to the lower end portion of the shaft 20. The lifter 25 has, as shown in FIG. 3, a pair of shoulder portions 25a and 25b formed at the outer periphery thereof. Both the shoulder portions 25a and 25b are capable of being engaged with the free ends of the reed valve bodies 12a and 12b, respectively. The reed valve bodies 12a and 12b can be bent by the engagement of the shoulder portions 25a and 25b with the free ends of the valve bodies 12a and 12b. The lifter 25 is arranged to be contained within a reservoir chamber 26 formed in the base 3 upon downward movement thereof to the lowermost end. When the lifter 25 is lowered to the lowermost end, the upper surfaces of the shoulder portions 25a and 25b descend lower than the upper surface of the valve seat 8. Accordingly, the free ends of the reed valve bodies 12a and 12b are released, and both the outlets 9a and 9b are closed by the reed valve bodies 12a and 12b. The lower end portion of the shaft 20 is threaded, and a clamping nut 27 of the lifter 25 is engaged with the threads of the shaft 20. An adjustment screw 28 is vertically movable engaged within the bottom wall of the cover 5. A spring seat 29 is mounted at the upper end of the adjustment screw 28. A spring 30, as a second urging member, for upwardly urging the lifter 25, the shaft 20 and the plunger 21 is bridged between the spring seat 39 and the lifter 25.

A pressure disc 31 corresponding to a pressing member is interposed between the plunger 21 and the lifter 25. A pad 32 which is formed of an elastic material such as rubber, synthetic resin, etc. is mounted at that portion of the peripheral edge of the pressure disc 31 which confronts each of the outlets 9a or 9b. A spring 33, as a first urging member, for urging the pressure disc 31 downward, and hence toward the reed valve bodies 12a and 12b, is bridged between the pressure disc 31 and the guide plate 2. The downward pressing force of the spring 33 is set larger than the upward pressing force of the spring 30 in the reservoir chamber 26, and the adjustments of these forces are carried out by the adjustment screw 28. The adjustment screw 28 is fixed by a lock nut 34. Both the pads 32 which are mounted at the pressure disc 31 are so adjusted that, when both the shoulder portions 25a and 25b of the lifter 25 descend lower than the upper surface of the valve seat 8, i.e., after the lifter 25 allows the complete release of the free ends of the reed valve bodies 12a and 12b, the pads 32 contact with the reed valve bodies 12a and 12b.

A cap 35 which is also operated as a terminal is secured to the yoke 15. A lifting amount adjustment screw 36 is engaged with the cap 35, and is fixed by a lock nut 37. This lifting amount adjustment screw 36 serves to adjust the lifting stroke of the shaft 20.

The operation of the above-described embodiment of the electromagnetic reed valve according to the present invention thus constructed will now be described in detail.

When a current flows through the solenoid coil 17, a magnetic force which is proportional to the amount of the current is produced at the stator core 19. Accordingly, the force by which the stator core 19 attracts the plunger 21 becomes proportional to the amount of this current. When this force by which the stator core 19 attracts the plunger 21 becomes larger than the difference between the pressing forces of the springs 30 and 33, the plunger 21 is lifted to the stator core 19 side. The plunger 21 thus lifted will stop at the position where the attracting force of the stator core 19 is balanced with the difference between the pressing forces of the both the springs 30 and 33. When the amount of the current is increased, the lifting amount of the plunger 21 will become large. Since the plunger 21 lifts the shaft 20, the pressure disc 31 and the lifter 25 are thus raised. In this case, there is provided a small gap between the lower surfaces of the reed valve bodies 12a and 12b and the upper surfaces of the both the shoulder portions 25a and 25b of the lifter 25. After the pad 32 of the pressure disc 31 is, accordingly, separated from the upper surfaces of the reed valve bodies 12a and 12b, both the shoulder portions 25a and 25b of the lifter 25 are engaged with both free ends of the reed valve bodies 12a and 12b. When the lifter 25 is raised the predetermined amount on the basis of the amount of current flowing through the solenoid coil, the free ends of the reed valve bodies 12a and 12b are raised in the substantially same amount as the lifter 25, so that the reed valve bodies 12a and 12b are deflected to produce a warp toward the valve chamber 4, with the result that the outlets 9a and 9b are opened.

Therefore, the fluid, (such as air), which is introduced from the inlet 7 to the valve chamber 4, is exhausted through the outlets 9a and 9b from the exits 11a and 11b.

When the current to the solenoid coil 17 is interrupted, the attracting force of the stator core 19 is released. Accordingly, the pressing force of the spring 33 exceeds that of the spring 30, with the result that the shaft 20, the plunger 21 and the lifter 25 are pressed down via the pressure disc 31. When the upper surfaces of both the shoulder portions 25a and 25b of the lifter 25 descend lower than the upper surface of the valve seat 8 and are thus submerged in the reservoir chamber 26, the reed valve bodies 12a and 12b are released from the lifter 25. Therefore, the reed valve bodies 12a and 12b are contacted with the valve seat 8 by the recoiling force thereof, thereby closing the outlets 9a and 9b. Thereafter, the pads 32 of the pressure disc 31 are effected by the force of the spring 33 and are thus contacted with the reed valve bodies 12a and 12b, respectively. In this manner, the reed valve bodies 12a and 12b are forcibly urged to the valve seat 8, so that the closure of the outlets 9a and 9b is effectively maintained, with the result that high sealability can be obtained.

Even if a foreign material M such as dust, cutting chips, etc. introduced into the valve chamber 4 is interposed, for example, between the valve seat 8 and the reed valve body 12b in the course of the reed valve bodies 12a and 12b being contacted with the valve seat 8 upon downward movement of the lifter 25, and particularly even if the foreign material M is engaged between the proximal portion of the reed valve 12b at the fixed end side and the valve seat 8, the pad 32 of the pressure disc 31 will urge that portion of the reed valve body 12b which confronts the outlet 9b toward the outlet 9b, with the result that the reed valve body 12b will not float from the valve seat 8, but high sealability can be obtained.

According to the electromagnetic reed valve in accordance with one preferred embodiment of the present invention thus described in detail, the pressing member 31 is mounted at the plunger 21 which varies its stroke in response to the amount of current applied to the solenoid 17. This pressing member 31 is urged by the spring 33 toward the reed valve bodies 12a and 12b. When the reed valve bodies 12a and 12b close the outlets 9a and 9b, the pressing member 31 urges at least those portion of the reed valve bodies 12a and 12b which confront the outlets 9a and 9b toward the outlets 9a and 9b. Therefore, since the reed valve bodies 12a and 12b are urged by the pressing member 32 when the reed valve bodies 12a and 12b close the outlets 9a and 9b according to the embodiment of this invention, the outlets 9a and 9b are effectively sealed by the reed valve bodies 12 and 12b. Even if a foreign material is introduced between the reed valve body 12a or 12b and the valve seat 8, the reed valve body 12a or 12b is forcibly urged by the pressing member 32 toward the outlet 9a or 9b, with the result that leakage of the fluid can be prevented. From this, a highly reliable electromagnetic reed valve can be provided according to the present invention.

What we claim is:

1. An electromagnetic reed valve comprising:
   a housing defining therein a valve chamber, said housing including an inlet port through which fluid flows into the valve chamber and an outlet port through which fluid flows out of the valve chamber;
   a reed valve body provided in the valve chamber capable of opening the outlet port of said housing, said reed valve body being secured at one end thereof and being free at the other end thereof;
   a solenoid provided in said housing for varying the magnetic force thereof in response to the value of a current applied thereto;
   a plunger moved at a stroke responsive to the magnetic force produced by the energization of said solenoid, said plunger having a lifter engaged with the free end of said reed valve body when said solenoid is energized so that the outlet port is opened in response to the stroke and disengaged from the free end of said reed valve body when said solenoid is deenergized so that the outlet port is closed; and
   pressing means for urging that portion of said reed valve body which confronts at least the output port when said solenoid is deenergized, said pressing means including a pressing member mounted at said plunger, capable of contacting with that portion of said reed valve body which confronts at least the outlet port thereof, and a first urging member for pressing said pressing member in contact with said that portion of said reed valve body when said solenoid is deenergized, said solenoid moving said plunger against the urging force of said first urging member when said solenoid is energized whereby the outlet port is opened, said first urging member including a first coil spring engaged at one end thereof with said housing and engaged at the other end thereof with said pressing member.

* * * * *